United States Patent
Oh et al.

(10) Patent No.: US 9,919,431 B2
(45) Date of Patent: Mar. 20, 2018

(54) CHARGE FEEDING SYSTEM AND CHARGE GRIPPING DEVICE

(71) Applicant: Hanwha Techwin Co., Ltd., Changwon-si (KR)

(72) Inventors: Jaeyi Oh, Changwon-si (KR); Sehoon Cho, Changwon-si (KR); Jinkook Lim, Changwon-si (KR); Seungryul Oh, Changwon-si (KR)

(73) Assignee: HANWHA LAND SYSTEMS CO., LTD., Changwon-Si (KR)

( * ) Notice: Subject to any disclaimer, the term of this patent is extended or adjusted under 35 U.S.C. 154(b) by 204 days.

(21) Appl. No.: 14/939,233

(22) Filed: Nov. 12, 2015

(65) Prior Publication Data

US 2016/0167878 A1    Jun. 16, 2016

(30) Foreign Application Priority Data

Dec. 11, 2014 (KR) ........................ 10-2014-0178717

(51) Int. Cl.
| | | |
|---|---|---|
| *B25J 15/00* | (2006.01) | |
| *B25J 5/04* | (2006.01) | |
| *B25J 15/02* | (2006.01) | |

(52) U.S. Cl.
CPC ............ *B25J 15/0052* (2013.01); *B25J 5/04* (2013.01); *B25J 15/026* (2013.01); *B25J 15/0213* (2013.01)

(58) Field of Classification Search
CPC ...... F41A 9/01; F41A 9/78; F41A 9/20; F41A 9/04; F41A 9/09; F41A 9/21; F41A 9/25; F41A 9/83; B65G 47/02; B65G 47/901; B65G 47/907; B65G 1/04; B65G 1/026; B65G 61/00; B65G 65/02; B65G 65/08; B25J 15/0052; B25J 15/0213; B25J 15/026; B25J 5/04; B25J 9/02; B66F 9/183; B66F 9/184; B66F 9/186; B66F 9/19; B66F 9/195; B66F 9/12; B66F 9/085; B66F 9/142; B66F 9/143; B66F 9/144; B66F 9/187

(Continued)

(56) References Cited

U.S. PATENT DOCUMENTS

| | | | | |
|---|---|---|---|---|
| 2,782,065 A | * | 2/1957 | Lord ...................... | B66F 9/183 294/119.1 |
| 2,978,126 A | * | 4/1961 | Chambers ................ | B66F 9/19 414/424 |

(Continued)

FOREIGN PATENT DOCUMENTS

| | | |
|---|---|---|
| JP | 6-16312 Y2 | 4/1994 |
| KR | 2001-0108958 A | 12/2001 |
| KR | 10-0651795 B1 | 11/2006 |

*Primary Examiner* — Glenn F Myers
(74) *Attorney, Agent, or Firm* — Sughrue Mion, PLLC

(57) ABSTRACT

A charge feeding system includes: a frame extending in a direction parallel to a direction of gravity; a plurality of grippers which are attached to the frame, spaced apart from one another in the extension direction of the frame, and independently open and close to grip charges loaded in a charge loading unit; a tray configured to pass through locations where the grippers are disposed along the extension direction of the frame, and transfer the charges between the grippers; and a controller configured to control opening and closing of the grippers and movement of the tray.

17 Claims, 14 Drawing Sheets

(58) Field of Classification Search
USPC ..... 89/33.1, 34, 45; 414/641, 642, 646, 618, 414/624, 625, 632, 633, 634
See application file for complete search history.

(56) References Cited

U.S. PATENT DOCUMENTS

| | | | | |
|---|---|---|---|---|
| 5,292,219 A * | 3/1994 | Merin | ................... | B25J 13/083 294/192 |
| 5,458,044 A | 10/1995 | Delbos | | |
| 5,823,737 A * | 10/1998 | Cook | ................... | B66F 9/183 414/451 |
| 6,328,520 B1 * | 12/2001 | Maclay | ................ | A01D 87/126 414/111 |
| 2004/0265106 A1 * | 12/2004 | Charvet | ................... | B66F 9/12 414/623 |
| 2006/0056947 A1 * | 3/2006 | Posly | ................... | B66F 9/06 414/419 |

* cited by examiner

CHARGE FEEDING SYSTEM AND CHARGE GRIPPING DEVICE

CROSS-REFERENCE TO THE RELATED APPLICATION

This application claims priority from Korean Patent Application No. 10-2014-0178717, filed on Dec. 11, 2014, in the Korean Intellectual Property Office, the disclosure of which is incorporated herein in its entirety by reference.

BACKGROUND

1. Field

Apparatuses and methods consistent with exemplary embodiments relate to a charge feeding system and a charge gripping device, and more particularly, to a charge feeding system and a charge gripping device which are capable of taking charges out without a residual quantity to rapidly transfer the charges to a firing location.

2. Description of the Related Art

A self-propelled artillery is battle equipment essentially used in a modern war. The self-propelled artillery moves between positions at a high speed in a state of being loaded with a shell and fires the shell against a target. The shell has a structure in which a charge is combined to a rear side of a projectile and is fired by an explosive force generated due to the ignition of the charge in a gun barrel. Therefore, in order for the self-propelled artillery to smoothly perform an automatic fire, it is necessary to rapidly feed the charge.

In a related art, as a process is semi-automatically or manually performed which loads and transfers the charge, manpower has been required, and it has taken a lot of time to feed the charge to the self-propelled artillery. In particular, when the charge is transferred in a state of being loaded on a charge loading container in a perpendicular direction, there is a limitation in that a charge remains in the charge loading container in a state of not being taken out from the charge loading container. Therefore, there is inconvenience in that the remaining charge is separately collected by manpower.

SUMMARY

One or more exemplary embodiments of the inventive concept provide a charge feeding system and a charge gripping device, which are capable of taking charges out without a residual quantity to rapidly transfer the charge to a firing location.

Various aspects of the inventive concept will be set forth in part in the exemplary embodiment which follows and, in part, will be apparent from the description of the exemplary embodiments, or may be learned by practice of the exemplary embodiments.

According to one or more exemplary embodiments, there is provided a charge feeding system which may include: a frame extending in a direction parallel to a direction of gravity; a plurality of grippers which are attached to the frame, spaced apart from one another in the extension direction of the frame, and independently open and close to grip charges loaded in a charge loading unit; a tray configured to pass through locations where the grippers are disposed along the extension direction of the frame, and transfer the charges between the grippers; and a controller configured to control opening and closing of the grippers and movement of the tray.

The charge feeding system may further include: a driving motor configured to generate power for driving the grippers; and a power transmitter configured to transmit the power, wherein each of the grippers includes: first and second fingers which are adjustable in location to move away from or closer to each other in a direction crossing the extension direction of the frame; a gripper shaft rotated by the power transmitted from the power transmitter to move at least one of the first and second fingers; and a power switch configured to transmit or block the power to the gripper shaft in response to a signal applied from the controller.

The at least one of the first and second fingers may be disposed to linearly move, and the gripper shaft may be disposed to penetrate the first and second fingers and has a screw surface screwed to the at least one of the first and second fingers.

The screw surface of the gripper shaft may have a first screw surface screwed to the first finger in a first rotation direction and a second screw surface screwed to the second finger in a second rotation direction which is opposite to the first rotation direction.

Each of the grippers may further include: a hinge shaft configured to support the first and second fingers; and a slider screwed to the gripper shaft and configured to linearly move along the gripper shaft and apply pressure to the at least one of the first and second fingers as the gripper shaft is rotated, wherein the slider is coupled to an outer surface of the gripper shaft.

Each of the first and second fingers may include a large hole through which the gripper shaft extends.

Each of the grippers may further includes an elastic unit configured to elastically support the at least one of the first and second fingers.

The power transmitter may include: a plurality of first gears respectively coupled to the grippers; and a plurality of second gears coupled between adjacent first gears, and the driving motor may rotate at least one of the first gears.

The tray may move from a location of a loaded gripper among the grippers to a location of a non-loaded gripper among the grippers and transfer a charge from the loaded gripper to the non-loaded gripper, wherein the loaded gripper is gripping the charge, and the non-loaded gripper is not gripping the charge.

The charge feeding system may further include: a transfer shaft that has a transfer screw surface on an outer surface thereof, extends in the extension direction of the frame, and is rotatable; and a transfer motor configured to generate power for rotating the transfer shaft, wherein the tray is screwed to the transfer shaft and moves along the transfer shaft as the transfer shaft is rotated.

The charge feeding system may further include: the above charge loading unit loaded with charge columns in which the charges are vertically stacked; and a sensor configured to sense the number of the charges loaded on the charge loading unit, wherein the controller controls the grippers based on a sensing signal received from the sensor to take the charges out from the charge loading unit.

According to one or more exemplary embodiments, a charge gripping device may include: a frame that extends in a vertical direction parallel to the direction of gravity; and a plurality of grippers disposed spaced apart from one another in the extension direction of the frame and configured to independently open and close to grip charges.

BRIEF DESCRIPTION OF THE DRAWINGS

These and/or other aspects will become apparent and more readily appreciated from the following description of the exemplary embodiments, taken in conjunction with the accompanying drawings, in which.

DETAILED DESCRIPTION OF THE EXEMPLARY EMBODIMENTS

Figure 1:
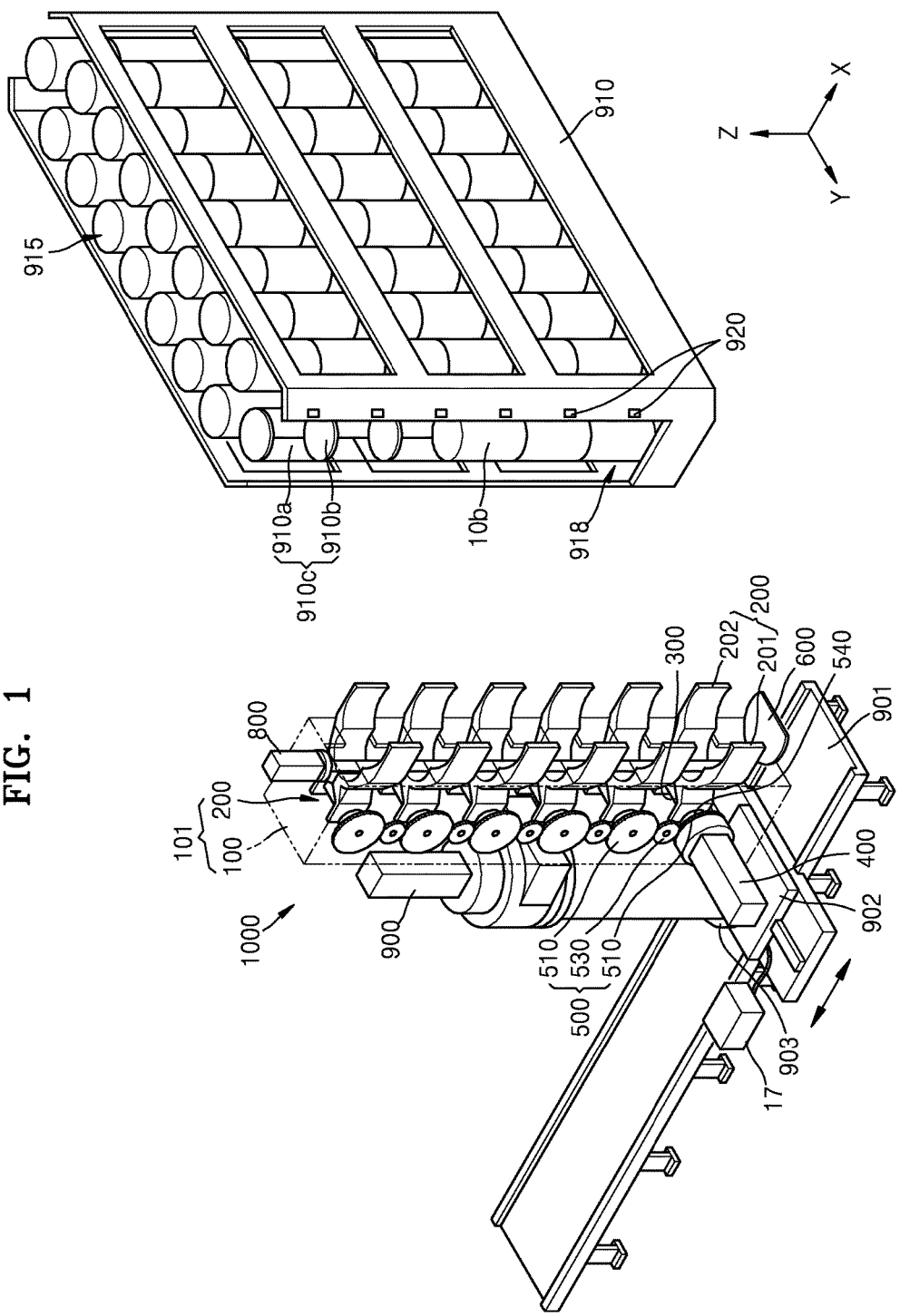
FIG. 1 is a perspective view of a charge feeding system, according to an exemplary embodiment.

Reference will now be made in detail to exemplary embodiments which are illustrated in the accompanying drawings, wherein like reference numerals refer to like elements throughout. In this regard, the present embodiments may have different forms and should not be construed as being limited to the descriptions set forth herein. Accordingly, the exemplary embodiments are merely described below, by referring to the figures, to explain aspects of the inventive concept. Expressions such as "at least one of," when preceding a list of elements, modify the entire list of elements and do not modify the individual elements of the list.

The terminology used herein is for the purpose of describing particular embodiments only and is not intended to be limiting of the inventive concept. As used herein, the singular forms "a", "an", and "the" are intended to include the plural forms as well, unless the context clearly indicates otherwise. It will also be understood that the terms "comprises", "includes", and "has", when used herein, specify the presence of stated elements, but do not preclude the presence or addition of other elements, unless otherwise defined. It will be understood that, although the terms "first", "second", "third", etc. may be used herein to describe various elements, these elements should not be limited by these terms. These terms are only used to distinguish one element from another.

Figure 2:
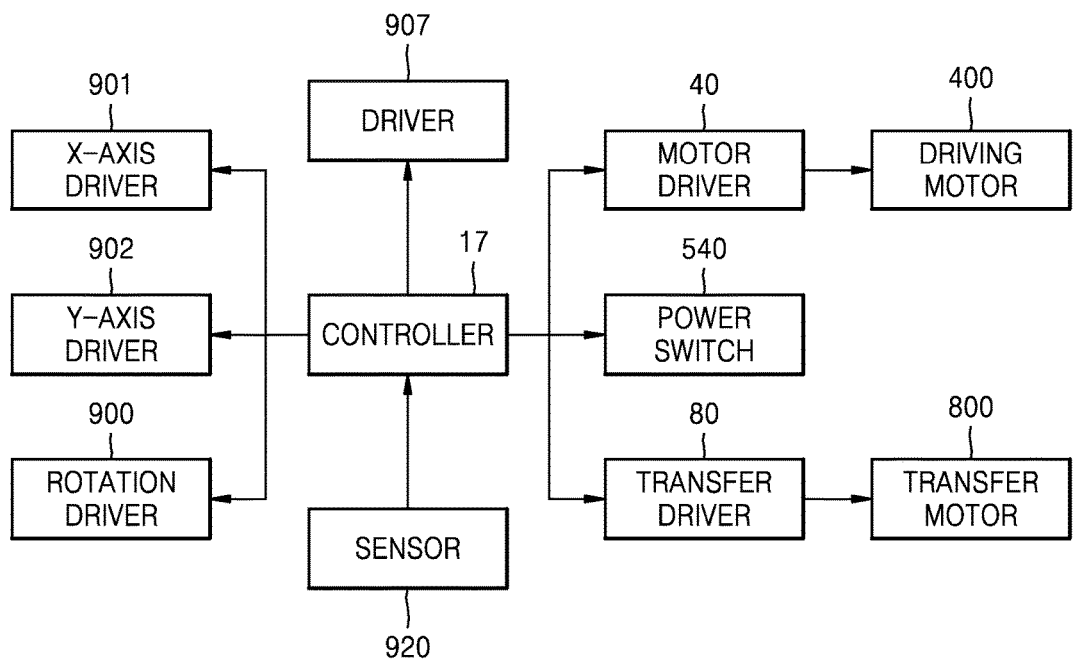
FIG. 2 is a block diagram for describing a connection relationship between a control unit and each configuration of the charge feeding system of FIG. 1, according to an exemplary embodiment.

FIG. 1 is a perspective view of a charge feeding system 1000, according to an exemplary embodiment, and FIG. 2 is a block diagram for describing a coupling relationship between a controller 17 and each configuration of the charge feeding system 1000 of FIG. 1, according to an exemplary embodiment.

The charge feeding system 1000 may include a charge gripping device 101 provided with a frame 100 and a plurality of grippers 200, a tray 600 configured to transfer a charge between the grippers 200 of the charge gripping device 101, and the controller 17 configured to control driving of the charge gripping device 101 and the tray 600.

The charge gripping device 101 may include the frame 100 that extends in a vertical direction (Z-axis direction) parallel to the direction of gravity and the plurality of grippers 200 that are disposed at the frame 100 and independently open/close.

A charge column 915, in which charges 10b are stacked in the vertical direction, may be disposed in a charge loading unit 910. A plurality of charge columns 915 may be disposed in the charge loading unit 910. Each of the charge columns 915 in the charge loading unit 910 may include a plurality of loading cells 910c which are stacked in the vertical direction and each of which includes a partition 910b configured to support the charge 10b and an accommodation space 910a configured to accommodate the charge 10b.

Figure 3:
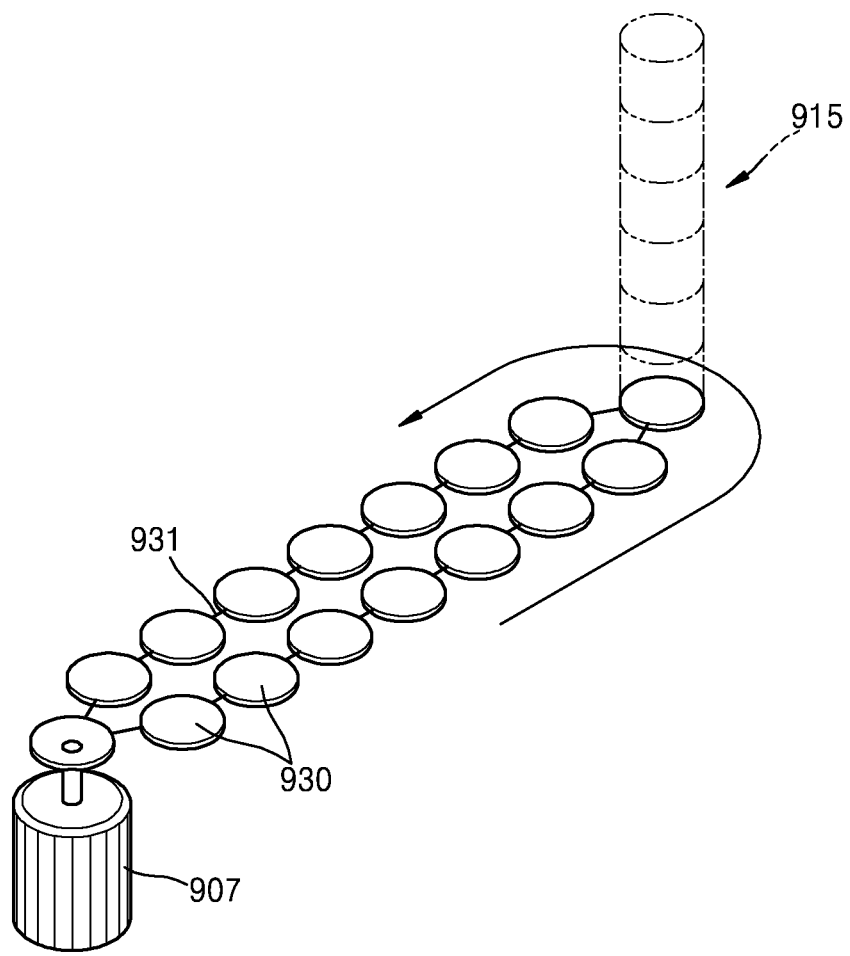
FIG. 3 is a perspective view of a driver of a charge loading unit in the charge feeding system of FIG. 1, according to an exemplary embodiment.

FIG. 3 is a perspective view of a driver 907 of the charge loading unit 910 in the charge feeding system 1000 of FIG. 1.

Referring to FIG. 3, a lower end of each of the charge columns 915 may be supported by each of column support units 930. The column support units 930 may be linked to one another by links 931, and may be moved by the driver 907 of the charge loading unit 910 to change locations of the charge columns 915.

A plurality of sensors 920 may be disposed in a takeout port 918 of the charge loading unit 910 to respectively correspond to the loading cells 910c of the charge columns 915. The sensors 920 may sense the charges 10b loaded in the loading cells 910c, and then, transfer sensing signals to the controller 17. Each of the sensors 920 may be implemented as an optical array sensor using infrared light or may be implemented as a contact switch operating by contacting the charges 10b loaded in the loading cells 901c.

Referring to FIG. 2, the controller 17 may be electrically connected to each of the sensors 920, a motor driver 40, a power switch 540, a transfer driver 80, an X-axis driver 901, and a Y-axis driver 902, and a rotation driver 900. The controller 17 may control the motor driver 40, the power switch 540, the transfer driver 80, the X-axis driver 901, and the Y-axis driver 902, and the rotation driver 900.

The controller 17 may include, for example, at least one of a control computer, a semiconductor chip installed with control software, and a circuit board mounted with a semiconductor chip.

The controller 17 may receive signals output from the sensors 920 and acquire information on residual quantities and locations of the charges 10*b* loaded in the charge columns 915 in the takeout port 918 of the charge loading unit 910 before and after the charge gripping device 101 takes the charges 10*b* out from the charge loading unit 910.

When the controller 17 outputs a control signal to the motor driver 40, the motor driver 40 may apply a current to a driving motor 400, and accordingly, the driving motor 400 may generate power for driving each of the grippers 200. Each of the grippers 200 may receive power from the driving motor 400 and a power transmitter 500 to perform an opening/closing operation.

The controller 17 may output a control signal to the power switch 540 to block power to gripper shafts 300 connected to grippers 200 that do not grip the charges 10*b*. Only grippers 200, which are connected to the gripper shafts 300 received power to maintain a rotation state, may grip the charges 10*b*.

When the controller 17 outputs a control signal to the transfer driver 80, the transfer driver 80 may apply a current to the transfer motor 800, and accordingly, the transfer shaft 700 receiving power of the transfer motor 800 may be rotated around a Z-axis. As the transfer shaft 700 may be rotated around the Z-axis, the tray 600 may linearly move in the Z-axis direction.

Figure 4:
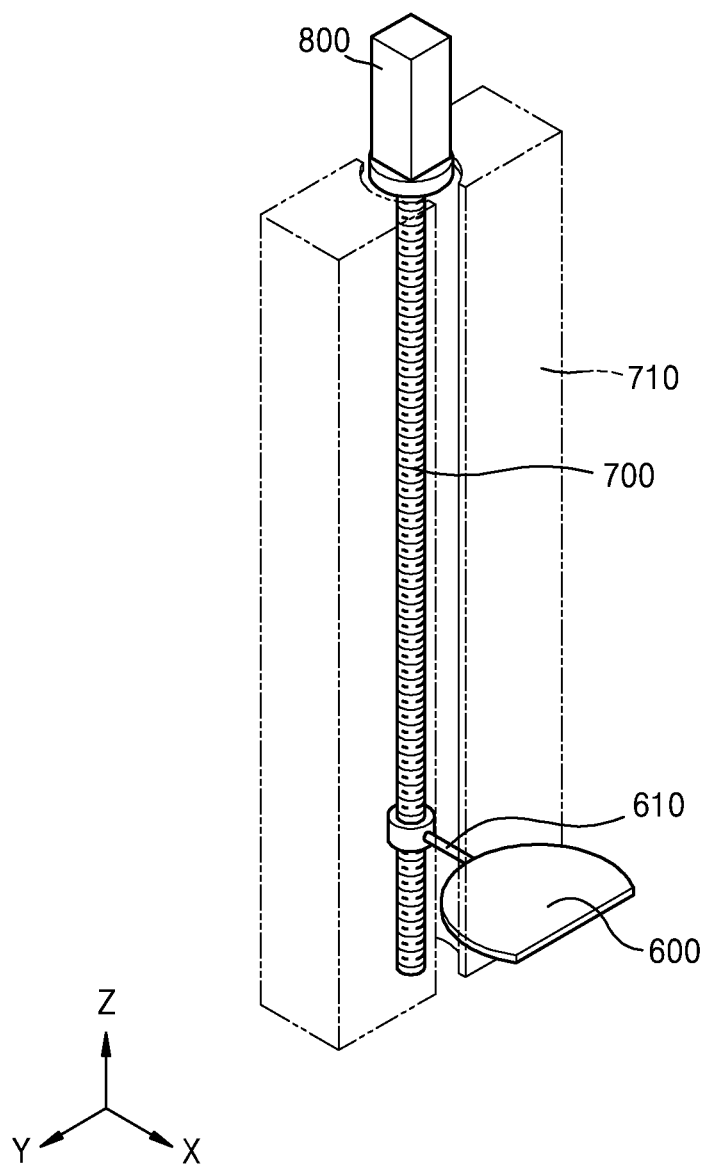
FIG. 4 is a perspective view of a tray and a transfer shaft of the charge feeding system of FIG. 1, according to an exemplary embodiment.

FIG. 4 is a perspective view of the tray 600 and the transfer shaft 700 of the charge feeding system 1000 of FIG. 1, according to an exemplary embodiment.

The charge feeding system 1000 may include the tray 600 configured to transfer the charges 10*b* between the grippers 200 by passing through locations where the grippers 200 are disposed in an extension direction of the frame 100. The charge feeding system 1000 may include the transfer shaft 700 and the transfer motor 800, which move the tray 600 in a length direction of the frame 100. The controller 17 may control the transfer motor 800 to control the movement of the tray 600. Referring to FIG. 1, the rotation driver 900 may be disposed on a surface or side of the frame 100 which is opposite to a surface on which the grippers 200 are disposed. The charge gripping device 101 may be rotated around the Z-axis on an X-Y plane by the rotation driver 900.

Referring to FIG. 1, the X-axis driver 901 may move the charge gripping device 101 in an X-axis direction. The Y-axis driver 902 may move the X-axis driver 901 and the charge gripping device 101 in a Y-axis direction. In addition, the charge gripping device 101 may be rotated around a rotation shaft 903 by the rotation driver 900.

After the charge gripping device 101 reaches the takeout port 918 of the charge loading unit 910 by operations of the X-axis driver 901, the Y-axis driver 902, and the rotation driver 900, the charge gripping device 101 may take a desired number of the charges 10*b* out from the charge column 915 in the takeout port 918, and then, transfer the taken-out charges 10*b* to a predetermined firing location.

The extension direction of the frame 100 may be the substantially the same as a direction parallel to the direction of gravity. The frame 100 may vertically extend to correspond to the charge loading unit 910. The frame 100 may support configurations of the charge gripping devices 101.

The frame 100 is illustrated in FIG. 1 as having a rectangular column but is not necessarily limited thereto. That is, the frame 100 may have any shape as long as the frame 100 extends in the Z-direction. The frame 100 may have a hollow shape that is able to accommodate the power transmitter 500, the power switch 540, and the like.

The plurality of grippers 200 may be disposed at the frame 100 to be spaced apart from one another in the extension direction of the frame 100. The grippers 200 may be operated by control of the controller 17 and may independently open/close. The grippers 200 may grip the charges 10*b* through an opening/closing operation.

Figure 5:
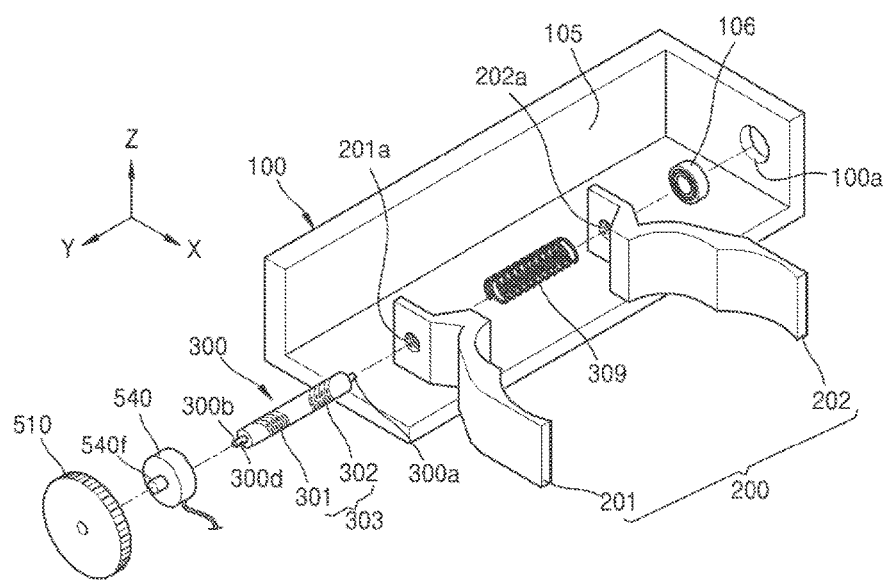
FIG. 5 is a perspective view for describing a connection relationship between configurations of each of grippers in the charge feeding system of FIG. 1, according to an exemplary embodiment.
Figure 6:
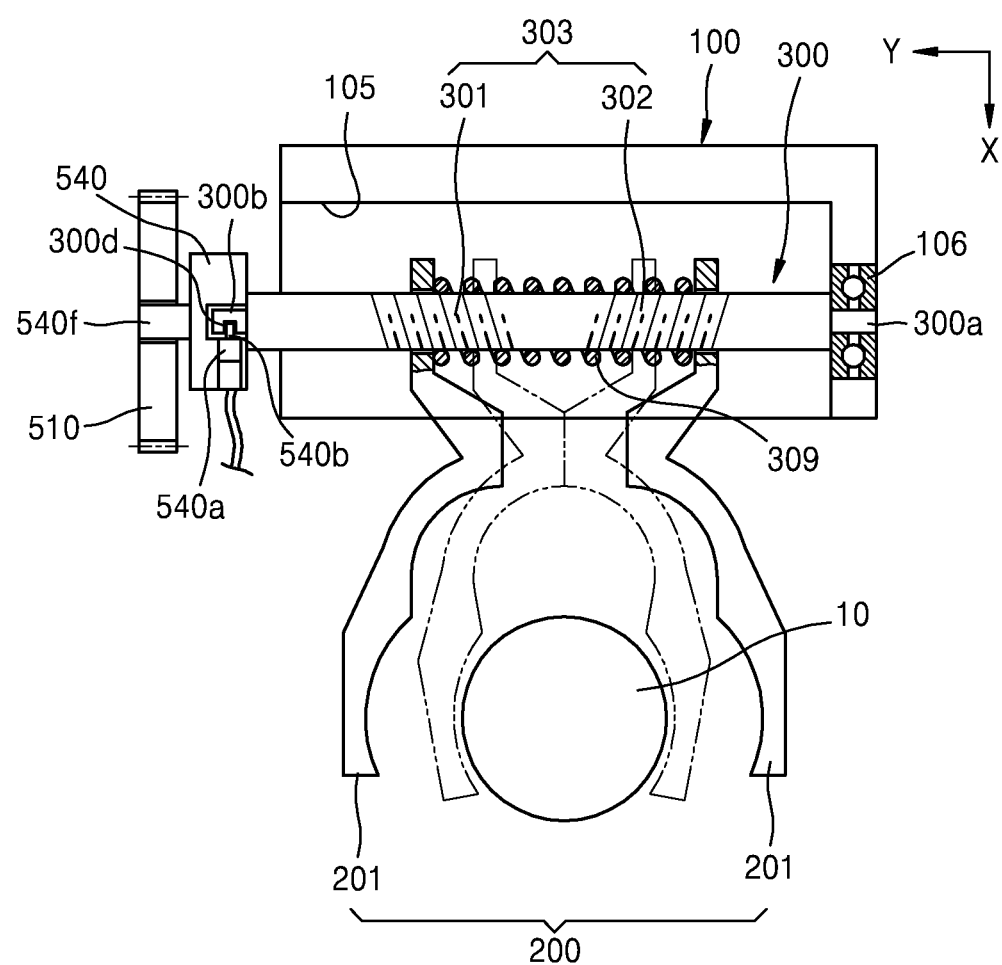
FIG. 6 is a cross-sectional view for describing a state in which a gripper of FIG. 5 is assembled, according to an exemplary embodiment.

FIG. 5 is a perspective view for describing a coupling relationship between configurations of the gripper 200 in the charge feeding system 1000 of FIG. 1, according to an exemplary embodiment, and FIG. 6 is a cross-sectional view for describing a state in which the of gripper 200 of FIG. 5 is assembled, according to an exemplary embodiment.

Each of the grippers 200 may include a first finger 201 and a second finger 202. The first and second fingers 201 and 202 may be disposed to be adjustable in location in a direction away from or closer to each other.

Each of the grippers 200 may include a gripper shaft 300 configured to move at least one of the first and second fingers 201 and 202, a driving motor 400 (see FIG. 1) configured to generate power for driving the gripper shaft 300, and a power transmitter 500 disposed between the driving motor 400 and the grippers 200 to transmit power. The gripper shaft 300 may be rotated by the power transmitted from the power transmitter 500 and move at least one of the first and second fingers 201 and 202.

A power switch 540 may be disposed at the gripper shaft 300 and may supply or block power to the gripper shaft 300 in response to a signal applied from the controller 17 of FIG. 1.

An end 300*a* of the gripper shaft 300 may be rotatably connected to a bearing 106 disposed in a hole 100*a* of a sidewall in the frame 100. The power switch 540 may be disposed at the other end 300*b* of the gripper shaft 300.

Referring to FIG. 1, the driving motor 400 illustrated in FIG. 1 may generate power for driving the grippers 200. In order to independently driving the grippers 200, the driving motor 400 may be disposed in number corresponding to the number of the grippers 200. However, when the number of the driving motors 400 is increased, a weight and a volume of the charge gripping device 101 may increase, and thus, an enormous amount of electric power may be consumed to move the charge gripping device 101.

In the charge feeding system 1000 according to an exemplary embodiment, one driving motor 400 may be disposed, and the power transmitter 500 and the power switch 540 may be used to independently drive the grippers 200.

The power transmitter 500 may transmit the power of the driving motor 400 to each of the grippers 200. The power transmitter 500 may include first gears 510 respectively coupled to the gripper shafts 300 through the power switch 540 and second gears 530 coupled between adjacent first gears 510. The driving motor 400 may be coupled to one of the first gears 510. The first gear 510 coupled to the driving motor 400 may be driven as a driving gear.

The second gears 530 may be disposed between adjacent first gears 510 and transmit power between the first gears 510.

The power switch 540 may be disposed at each of the gripper shafts 300 to selectively switch on and off a rotation of the gripper shaft 300. That is, the power switch 540 may rotate only gripper shafts 300 connected to the grippers 200 to be opened/closed, and may not rotate the remaining gripper shafts 300. Accordingly, the grippers 200 may be independently driven to grip a desired number of the charges 10*b* at a predetermined location of the charge loading unit.

Referring to FIGS. 4 and 5, a shaft 540*f* of the power switch 540 may be connected to the first gear 510. Therefore, when the first gear 510 is rotated, the power switch 540 may be rotated together with the first gear 510.

The power switch 540 may selectively switch on and off the power transmitted to each of the gripper shafts 300 by the first gear 510.

The power switch 540 may include a solenoid 540a that is operated in response to a signal applied from the controller 17. When the signal is applied to the solenoid 540a, an operation pin 540b may protrude toward a coupling groove 300d formed in one end 300b of the gripper shaft 300 and may be coupled in the coupling groove 300d.

The power switch 540, the first gear 510, and the gripper shaft 300 may be rotated together in a state that the operation pin 540b is coupled in the coupling groove 300d. In a state that the operation pin 540b is not coupled in the coupling groove 300d, while the power switch 540 and the first gear 510 are rotated, the gripper shaft 300 may not be rotated.

The first and second fingers 201 and 202 may be disposed to linearly move in a Y-axis direction. The frame 100 may include a linear motion guide 105 that extends in the Y-axis direction to guide the first and second fingers 201 and 202 to linearly move.

The gripper shaft 300 may have a screw surface 303 screwed to at least one of the first and second fingers 201 and 202, and may be rotatably disposed by penetrating the first and second fingers 201 and 202.

The screw surface 303 of the gripper shaft 300 may have a first screw surface 301 screwed into a screw hole 201a of the first finger 201 in a first rotation direction and a second screw surface 302 screwed into a screw hole 202a of the second finger 202 in a second rotation direction that is opposite to the first rotation direction. For example, in FIGS. 5 and 6, at the time of moving from left to right in a length direction of the gripper shaft 300, when the first screw surface 301 is formed in a clockwise direction with respect to a center of the gripper shaft 300, the second screw surface 302 may be formed in a counterclockwise direction.

As described above, since the first and second screw surfaces 301 and 302 are formed in opposite rotation directions, due to a rotary motion of the gripper shaft 300, the first and second fingers 201 and 202 may linearly move in opposite directions.

For example, in FIG. 6, when the gripper shaft 300 is rotated in the clockwise direction, the first and second fingers 201 and 202 may linearly move in the Y-axis direction in a direction away from each other to open the gripper 200. In addition, when the gripper shaft 300 is rotated in the counterclockwise direction, the first and second fingers 201 and 202 may linearly move in the Y-axis direction in a direction closer to each other to close the gripper 200, and thus, a charge 10 may be gripped between the first finger 201 and the second finger 202.

A spring 309 may be disposed between the first finger 201 and the second finger 202. The spring 309 may assist the first and second fingers 201 and 202 to smoothly perform a linear motion along the gripper shaft 300 by applying an elastic force to the first and second fingers 201 and 202

In an exemplary embodiment of FIGS. 5 and 6, the gripper shaft 300 is illustrated as being screwed to both of the first and second fingers 201 and 202, but the inventive concept is not limited thereto. For example, the gripper shaft 300 may be screwed to only one of the first and second fingers 201 and 202, and may penetrate the other one of the first and second fingers 201 and 202. One of the first and second fingers 201 and 202 coupled to the gripper shaft 300 may linearly move by the rotary motion of the gripper shaft 300 to implement the opening/closing operation of the gripper 200.

Referring to FIGS. 1 and 4, the tray 600 may move in a length direction of the frame 100, that is, the Z-axis direction. In addition, the tray 600 may protrude in the X-direction with respect to a transfer shaft 700 to be described later.

The tray 600 may pass through the gripper 200 to move in the Z-axis direction, and accordingly, the gripped charge 10 may be transferred to a location of a targeted gripper 200 in a state of being placed on one surface of the tray 600. That is, after the gripped charge 10 is transferred to an empty gripper 200, a new charge 10 may be gripped, thereby allowing a residual quantity of a charge not to remain in the charge loading unit 910.

The transfer shaft 700 may extend in the length direction of the frame 100, that is, the Z-axis direction. In order to transfer the gripped charge 10 to a predetermined gripper 200, the tray 600 may be coupled to the transfer shaft 700 to move in a length direction of the transfer shaft 700.

The transfer shaft 700 may be rotated around the Z-axis, and the transfer motor 800 may generate power for rotating the transfer shaft 700.

Since the transfer shaft 700 may include a lead screw on an outer surface thereof, when the transfer shaft 700 is rotated once around the Z-axis, the tray 600 may move in the Z-axis direction by a predetermined pitch.

The tray 600 may include a coupling unit 610 screwed to the transfer shaft 700. A screw surface may be formed inside of the coupling unit 610 to guide the above-described lead screw of the transfer shaft 700 to move ahead in a length direction of the transfer shaft 700 at the same time as a rotation of the transfer shaft 700. Accordingly, the lead screw of the transfer shaft 700 may be engaged with the screw surface inside of the coupling unit 610, and thus, a rotary motion of the transfer shaft 700 may be converted into a linear motion of the tray 600. That is, while the transfer shaft 700 may be rotated around the Z-axis, the transfer shaft 700 may move in the Z-axis direction to move the tray 600 coupled thereto in the Z-axis direction.

At this time, a guide 710 may be disposed at the frame 100 in the length direction of the transfer shaft 700 to confine a side surface of the coupling unit 610. Accordingly, the tray 600 may not be rotated around the Z-axis, and may linearly move in the Z-axis direction. However, the inventive concept is not necessarily limited thereto, and the guide 710 may have any structure as long as the guide 710 confines the coupling unit 610 of the tray 600 not to be rotated.

As described above, the transfer shaft 700 may include the lead screw, but the inventive concept is not limited thereto. In some exemplary embodiments, the transfer motor 800 may be implemented as a linear motor to linearly move the tray 600 coupled to the transfer shaft 700. That is, the transfer shaft 700 may have any shape as long as the transfer shaft 700 moves the tray 600 in the length direction of the transfer shaft 700.

When the gripper 200 is required to grip a new charge in a state that the gripper 200 grips the charge 10, the charge 10 gripped by the gripper 200 may be placed on the tray 600 and may be transferred to a location of the other gripper 200, and the gripper 200 gripping the charge 10 may be independently driven to grip the new charge. Therefore, there is a need for a control unit configured to control each of the configurations such that a series of processes may be automatically performed without an interference of each of configurations.

Hereinafter, a process of taking a charge 10 out from the charge loading unit 910 in the charge feeding system 1000 will be described with reference to FIGS. 7 to 10.

Figure 7:
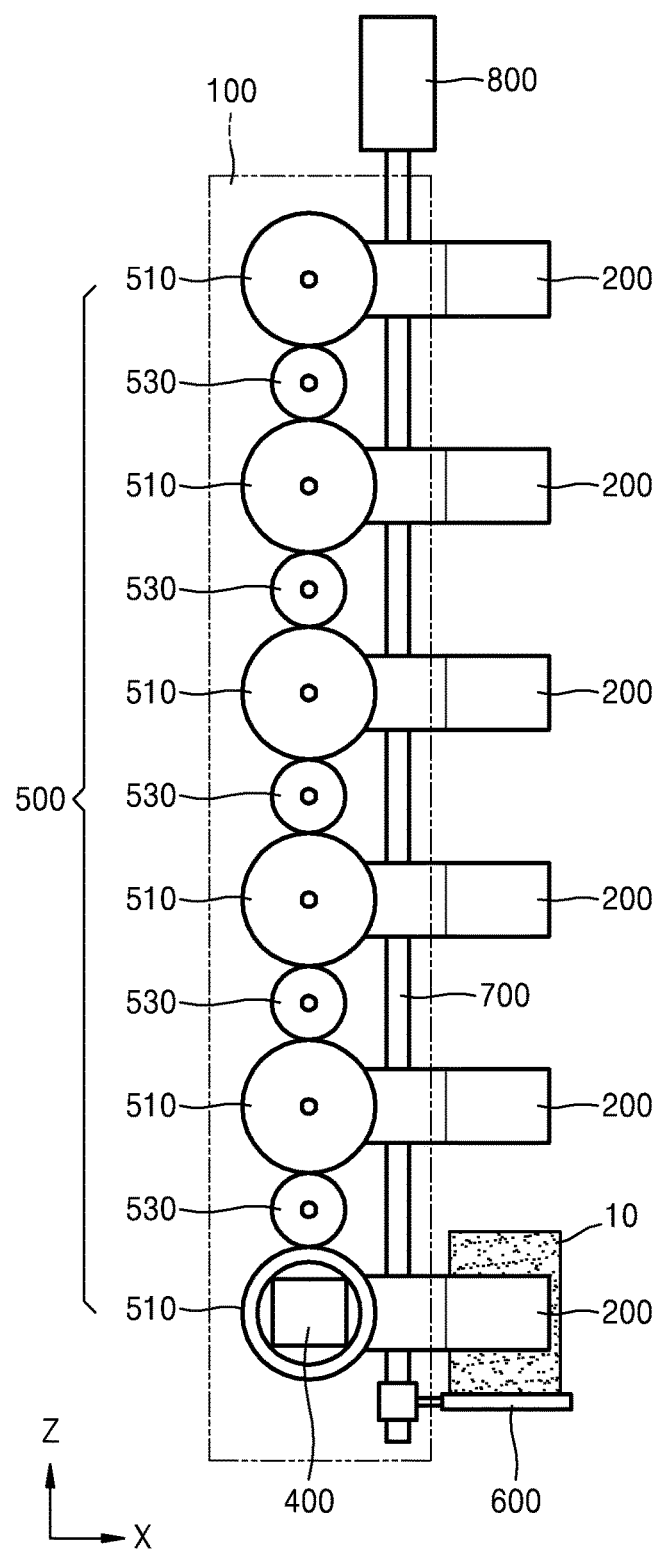
FIG. 7 is an operation state diagram for describing for an operation of taking a charge out in the charge feeding system of FIG. 1, according to an exemplary embodiment.
Figure 8:
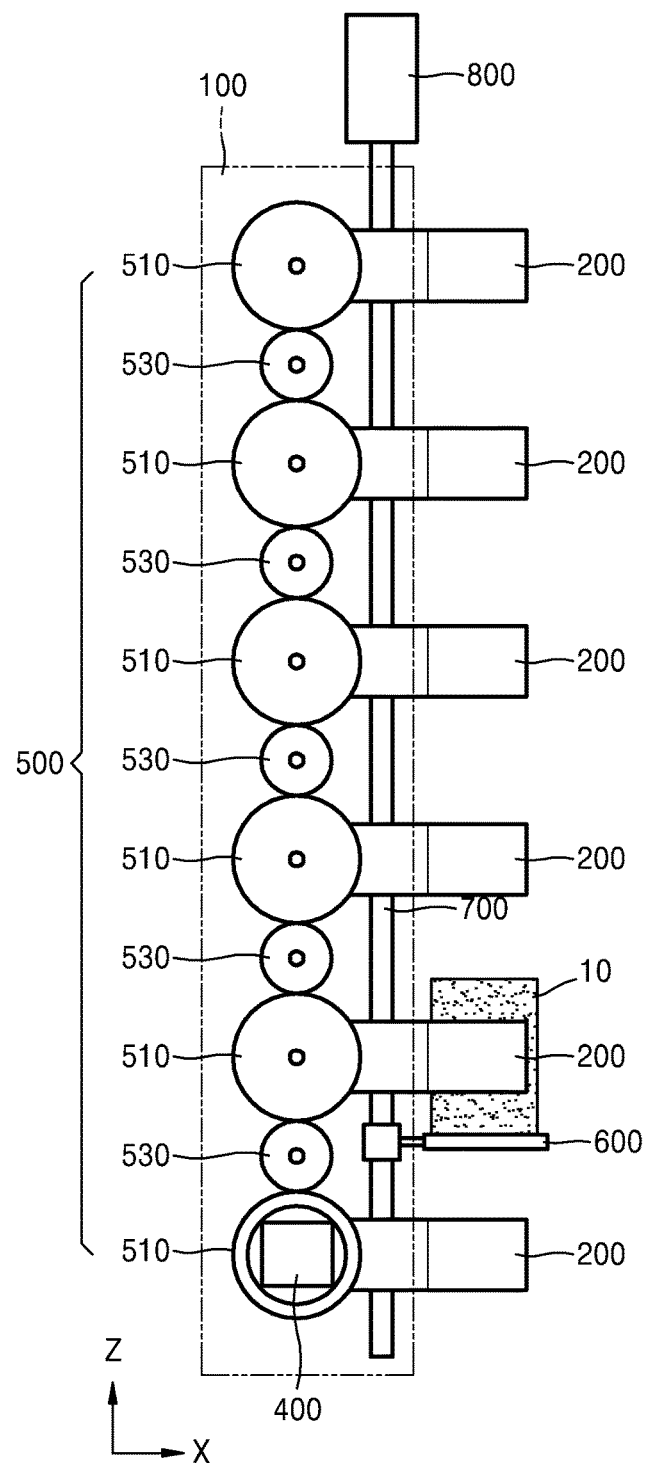
FIG. 8 is an operation state diagram for describing an operation of transferring a charge in a tray of the charge feeding system of FIG. 7, according to an exemplary embodiment.
Figure 9:
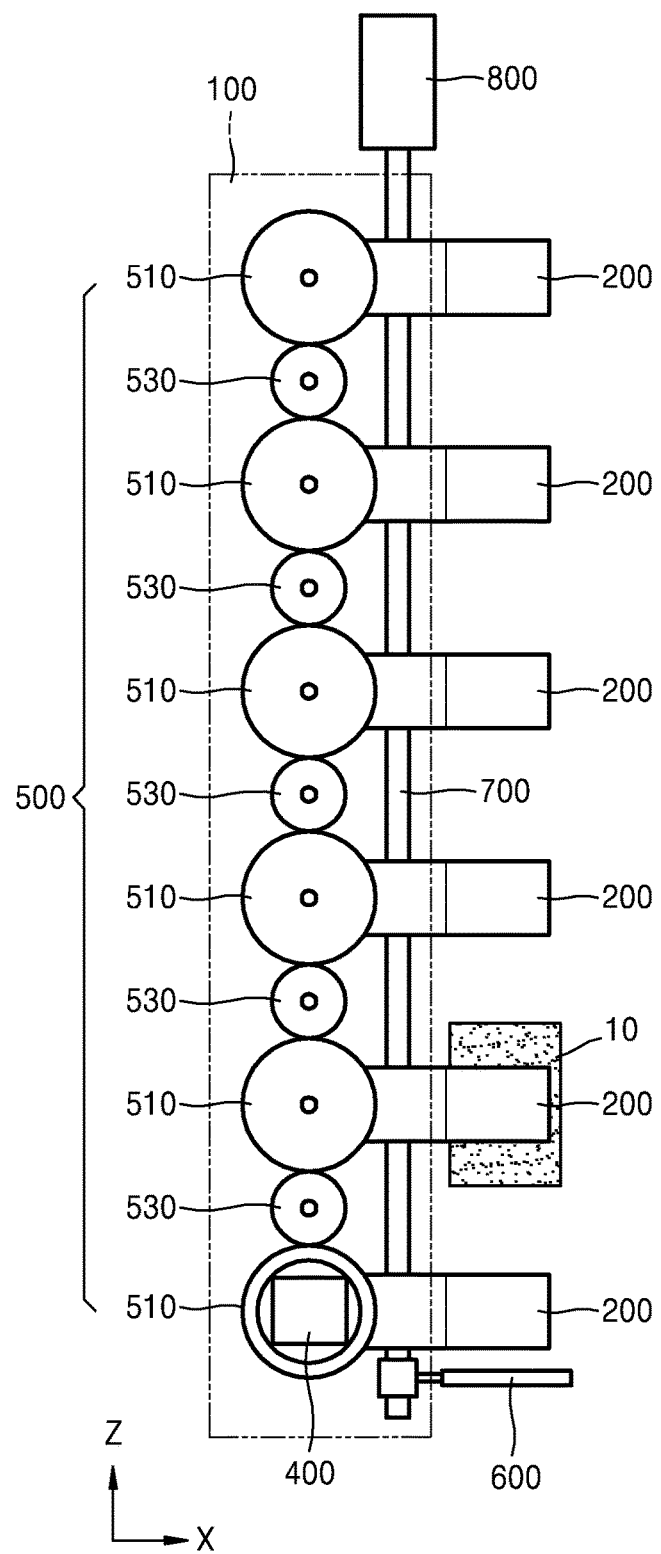
FIG. 9 is an operation state diagram for describing a state in which a transfer of a charge is ended in the charge feeding system of FIG. 8, according to an exemplary embodiment.
Figure 10:
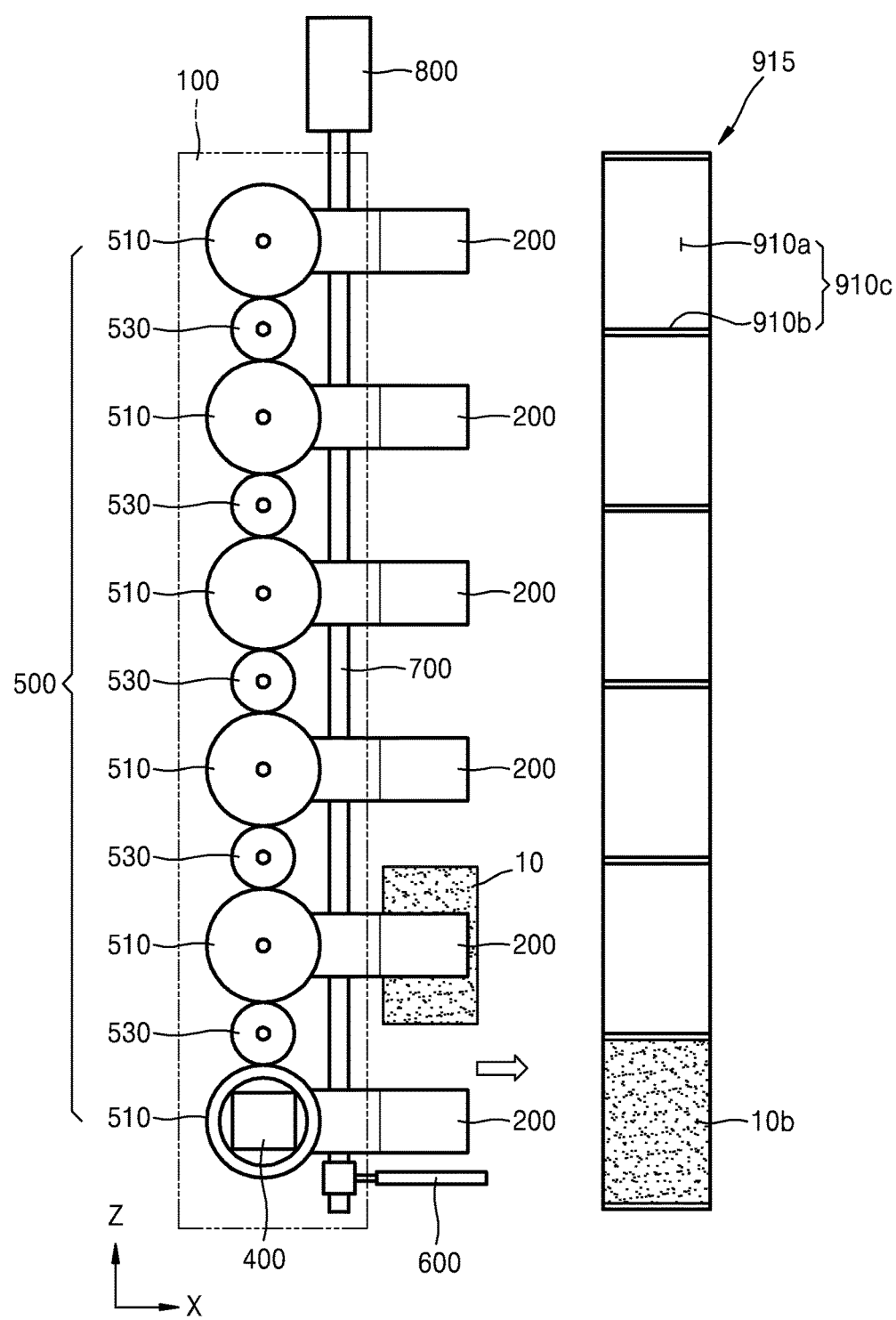
FIG. 10 is an operation state diagram for describing an operation of taking a charge out again in the charge feeding system of FIG. 9, according to an exemplary embodiment.

FIG. 7 is an operation state diagram for describing an operation of taking the charge 10 out in the charge feeding system 1000 of FIG. 1, according to an exemplary embodiment, FIG. 8 is an operation state diagram for describing an operation of transferring the charge 10 in the tray 600 of the charge feeding system 1000 of FIG. 7, according to an exemplary embodiment, FIG. 9 is an operation state diagram for describing a state in which the transfer of the charge 10 is ended in the charge feeding system 1000 of FIG. 8, according to an exemplary embodiment, and FIG. 10 is an operation state diagram for describing an operation of taking the charge 10 out again in the charge feeding system 1000 of FIG. 9, according to an exemplary embodiment. A process of taking the charge 10 illustrated in FIGS. 7 and 10 is a mere example for understanding of the inventive concept.

Referring to FIG. 7, power may be transmitted to the grippers 200 through the first and second gears 510 and 530 driven by the driving motor 400 disposed at the frame 100. In FIG. 7, only a lowermost gripper 200 may be opened/closed to grip the charge 10.

Referring to FIGS. 8 and 9, the charge 10 gripped by the lowermost gripper 200 may be transferred from the lowermost gripper 200 to a second gripper 200. The tray 600 screwed to the transfer shaft 700 may move from a location of the lowermost gripper 200 to a location of the second gripper 200 in the state that the charge 10 is placed on one surface of the tray 600. The tray 600 transferring the charge 10 may be returned to a location of the lowermost gripper 200 primarily gripping the charge 10.

Referring to FIG. 10, a residual quantity of the charges 10b may remain in a lowermost one cell of the charge column 915 in which the charges 10b are capable of being stacked in the Z-direction.

In the operation described with reference with FIGS. 8 and 9, the lowermost gripper 200 in a state of not gripping the charge may grip the residual quantity of the charges 10b again in the lowermost cell of the charge column 915. Therefore, since the residual quantity of the charges 10b does not remain in the charge column 915, all of the charges 10b of the charge loading unit 910 may be automatically exhausted.

Figure 15:
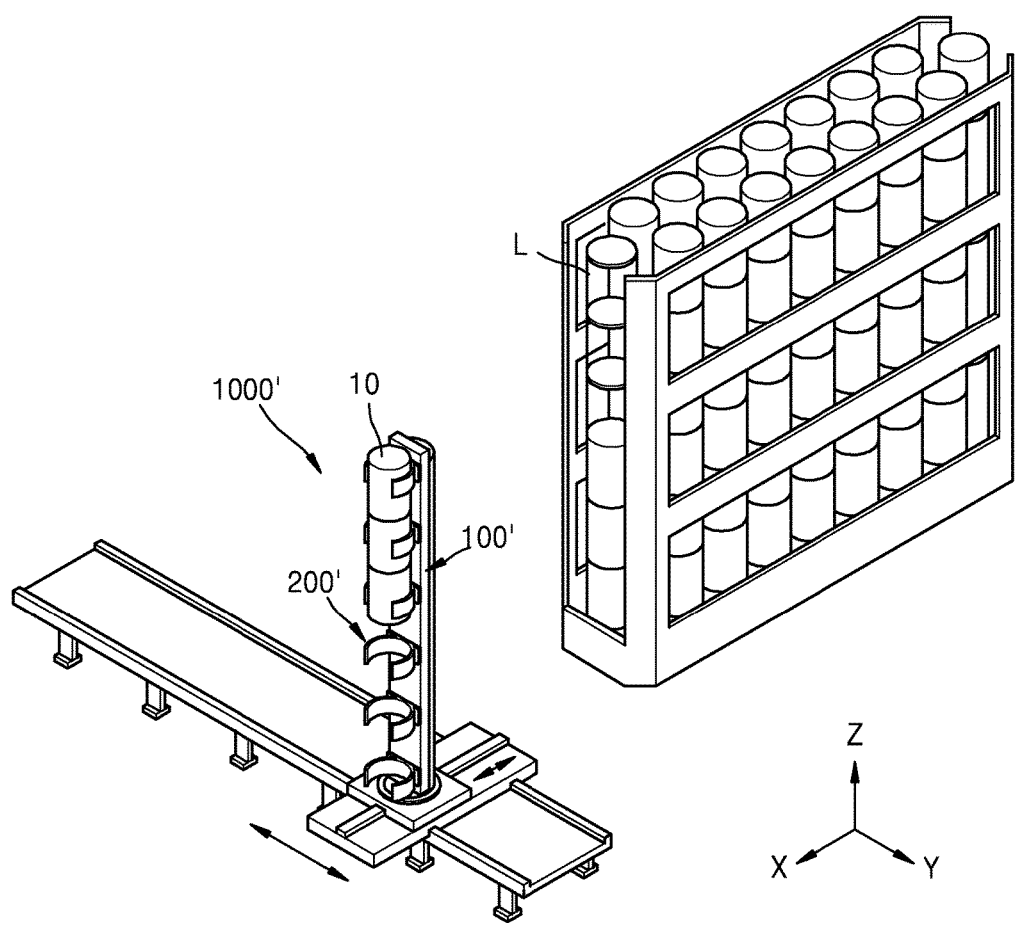
FIG. 15 is a perspective view of comparative example of the charge feeding system of FIG. 1.

FIG. 15 is a perspective view of comparative example 1000' of the charge feeding system 1000 of FIG. 1.

As illustrated in FIG. 15, comparative example 1000' may take charges 10 out from a charge column L in which the charges 10 are stacked in an axis direction as in the charge feeding system 1000 of FIG. 1. Grippers 200' may take the three to six charges 10 out from the charge column L at the same time. When the grippers 200' takes the three charges 10 out from the charge column L in a singe operation, three charges 10 may remain in the charge column L in a state of not being taken out. When it is necessary to take six charges out, the three charges remaining in the charge column L may not be taken out and may be transferred to other column L, and it is necessary to take six charges out at once. When such a process is repeated, since a residual quantity of charges 10 remains in each charge column L, it is necessary to separately collect the residual quantity through a manual operation. Therefore, since unnecessary time is required for transferring the charge to the firing location, and manpower is input, it is difficult for the self-propelled artillery to automatically and rapidly fire the shell.

However, in the charge feeding system 1000 according to an exemplary embodiment, the charge may be transferred to the firing location without the residual quantity of the charge.

In addition, in the charge feeding system 1000, since the taking out of the charge is automatically performed, the charge may be rapidly transferred to the firing location.

Figure 11:
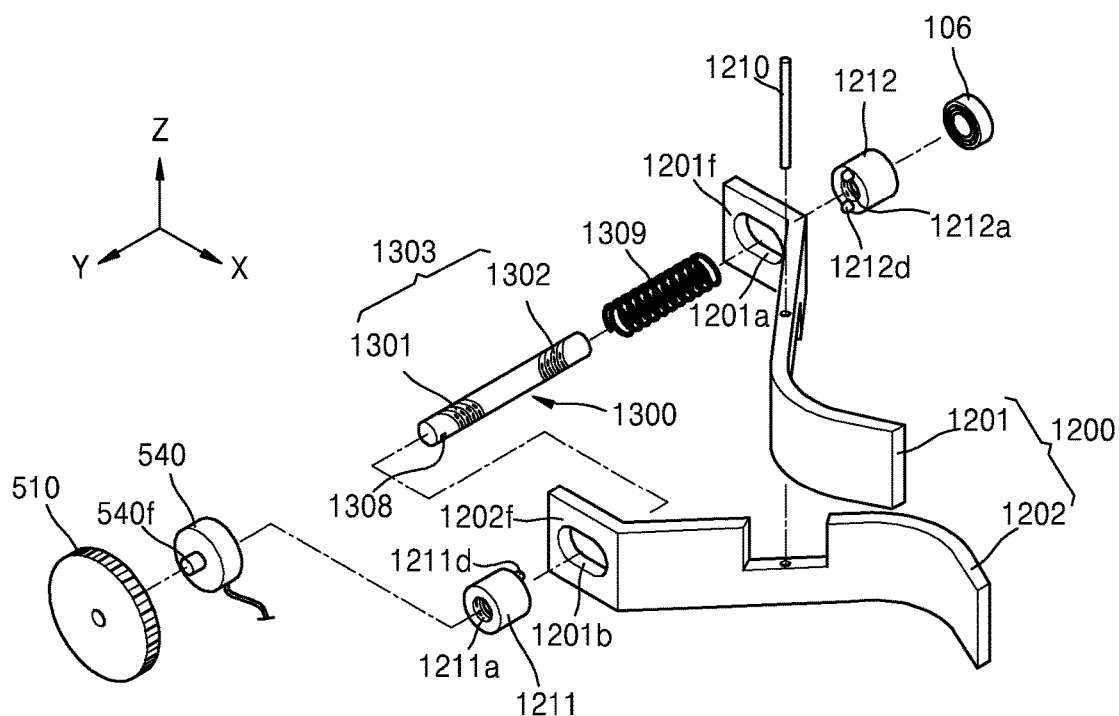
FIG. 11 is a perspective view for describing a coupling relationship between configurations of a gripper in the charge feeding system, according to another exemplary embodiment.
Figure 12:
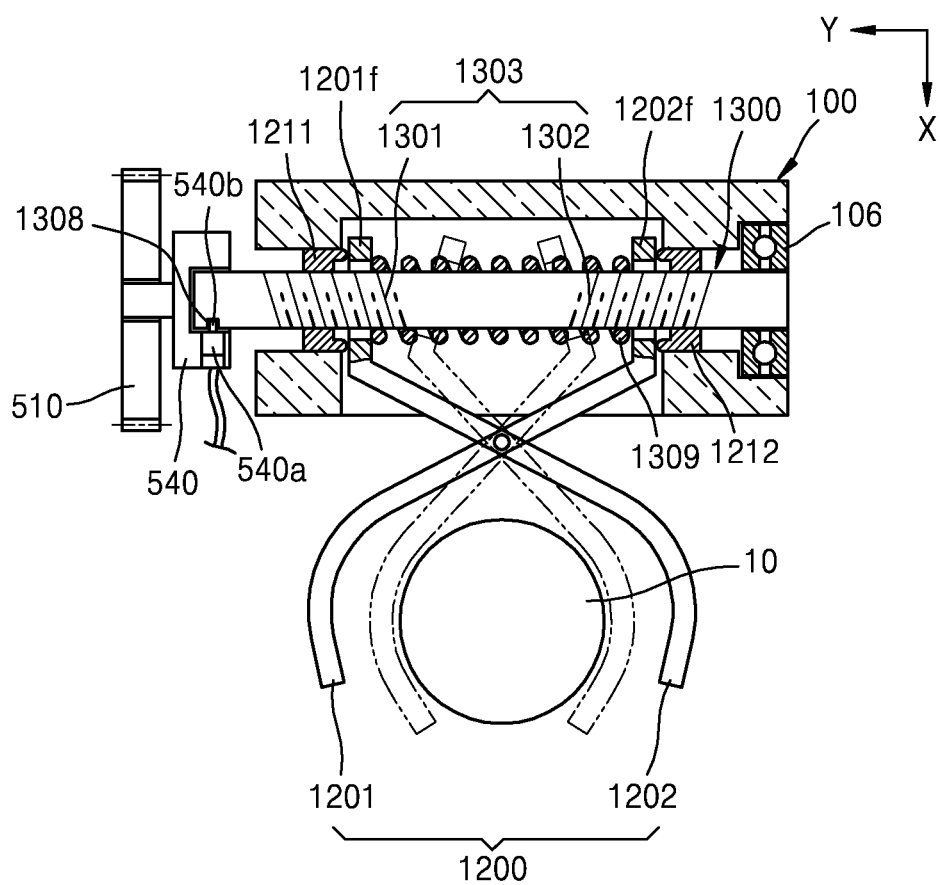
FIG. 12 is a cross-sectional view for describing a state in which the gripper of FIG. 11 is assembled, according to an exemplary embodiment.

Furthermore, the charge feeding system 1000 may take a desired number of the charges out from a charge loading unit FIG. 11 is a perspective view for describing a coupling relationship between configurations of a gripper 1200 in the charge feeding system 1000, according to another exemplary embodiment, and FIG. 12 is a cross-sectional view for describing a state in which the gripper 1200 of FIG. 11 is assembled.

The gripper 1200 illustrated in FIGS. 11 and 12 according to another embodiment may have the configurations modified from the configurations of the gripper 200 illustrated in FIGS. 5 and 6.

The gripper 1200 may include first and second fingers 1201 and 1202 disposed to be adjustable in location in a direction away from or closer to each other, a gripper shaft 1300 rotated by power transmitted from a first gear 510 of a power transmitter 500 to move at least one of the first and second fingers 1201 and 1202, a power switch 540 configured to transmit or block the power to the gripper shaft 1300 in response to a signal applied from the controller 17, a hinge shaft 1210 configured to rotatably support the first and second fingers 1201 and 1202, and first and second sliders 1211 and 1212 screwed to the gripper shaft 1300 and configured to linearly move along the gripper shaft 1300 and apply pressure to the at least one of the first and second fingers 1201 and 1202 as the gripper shaft 1300 is rotated, wherein the slider is coupled to an outer surface of the gripper shaft.

The power switch 540 may be disposed at the gripper shaft 1300, and may supply or block the power to the gripper shaft 1300 in response to the signal applied from the controller 17.

One end of the gripper shaft 1300 may be rotatably connected to one sidewall of the frame 100 by a bearing 106. The power switch 540 may be disposed at the other end of the gripper shaft 1300.

The power switch 540 may include a solenoid 540a that is operated in response to a signal applied from the controller 17. When the signal is applied to the solenoid 540a, an operation pin 540b may protrude toward a coupling groove 1308 formed in the gripper shaft 1300 and may be coupled in the coupling groove 1308.

The power switch 540, the first gear 510, and the gripper shaft 1300 may be rotated together in a state that the operation pin 540b is coupled in the coupling groove 1308. In a state that the operation pin 540b is not coupled in the coupling groove 1308, while the power switch 540 and the first gear 510 are rotated, the gripper shaft 1300 may not be rotated.

The first and second fingers 1201 and 1202 may be rotated around the hinge shaft 1210. Each of the first and second fingers 1201 and 1202 may include large holes 1201a and 1202a through which the gripper shaft 1300 extends. The large holes 1201a and 1202a may provide spaces for rotary motions of the first and second fingers 1201 and 1202 such that the first and second fingers 1201 and 1202 and the gripper shaft 1300 do not interrupt each other when the first and second fingers 1201 and 1202 are rotated.

A screw surface 1303 may be formed on an outer surface of the gripper shaft 1300. The screw surface 1303 may have a first screw surface 1301 formed in a first rotation direction and a second screw surface 1302 formed in a second rotation direction which is opposite to the first rotation direction. For example, in FIGS. 11 and 12, at the time of moving from left to right in a length direction of the gripper shaft 1300, when the first screw surface 1301 is formed in a clockwise direction with respect to a center of the gripper shaft 1300, and the second screw surface 1302 may be formed in a counterclockwise direction.

In addition, the first and second sliders 1211 and 1212 may be coupled to the outer surface of the gripper shaft 1300. The first slider 1211 may include a screw hole 1211a corresponding to the first screw surface 1301 of the gripper shaft 1300 to be screwed to the first screw surface 1301. The second slider 1212 may include a screw hole 1212a corresponding to the second screw surface 1302 of the gripper shaft 1300 to be screwed to the second screw surface 1302.

In addition, the first slider 1211 may include a protrusion 1211d pressuring a rear end 1202f of the second finger 1202, and the second slider 1212 may include a protrusion 1212d pressuring a rear end 1201f of the first finger 1201.

As described above, since the first and second screw surfaces 1301 and 1302 are formed in opposite rotation directions, due to a rotary motion of the gripper shaft 1300, the first and second fingers 1211 and 1212 may linearly move in opposite directions.

For example, in FIG. 12, when the gripper shaft 1300 is rotated in the clockwise direction, the first and second sliders 1211 and 1212 may linearly move in a Y-axis direction in a direction away from each other, and thus, the first and second fingers 1201 and 1202 may be away from each other to open the gripper 1200. In addition, when the gripper shaft 1300 is rotated in the counterclockwise direction, the first and second sliders 1211 and 1212 may linearly move in the Y-axis direction in a direction closer to each other, and the first and second fingers 1201 and 1202 may be closer to each other to close the gripper 1200, thereby the charge 10 may be gripped between the first finger 1202 and the second finger 1202.

A spring 1309 may be disposed between the first finger 1201 and the second finger 1202. The spring 1309 may assist the first and second fingers 1201 and 1202 to smoothly perform a linear motion around the hinge shaft 1210 by proving an elastic force to the first and second fingers 1201 and 1202. The spring 1309 may be a mere example of an elastic unit disposed between the first finger 1201 and the second finger 1202, and the elastic unit may be implemented by using a gas cylinder or a rubber material instead of a compressed coil spring.

Figure 13:
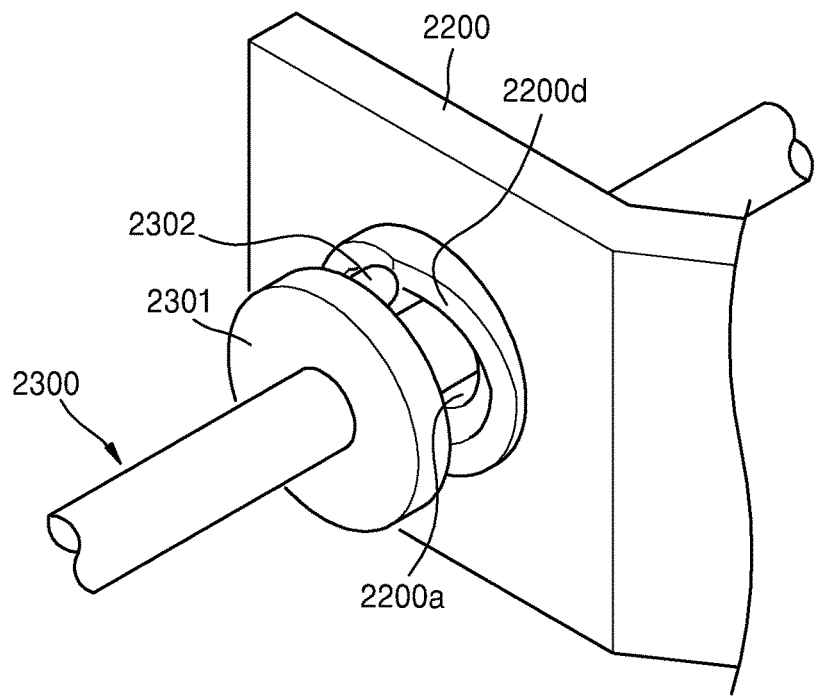
FIG. 13 is a perspective view of a gripper of the charge feeding system, according to another exemplary embodiment.
Figure 14:
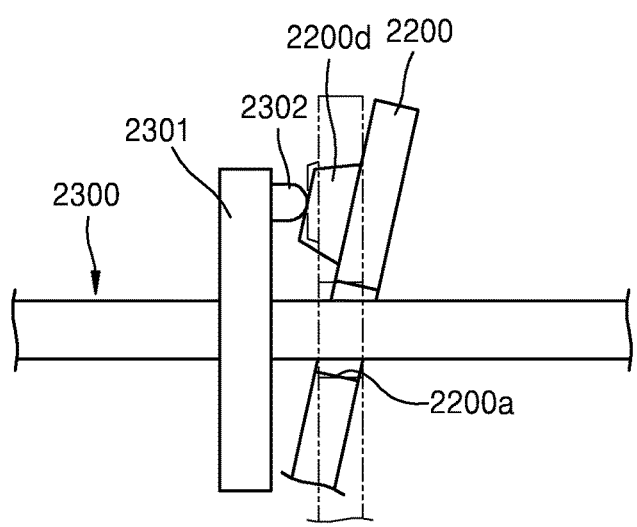
FIG. 14 is a cross-sectional view for describing an operation state of the gripper of FIG. 13, according to an exemplary embodiment.

FIG. 13 is a perspective view of a gripper 2200 of the charge feeding system 1000, according to another exemplary embodiment, and FIG. 14 is a cross-sectional view for describing an operation state of the gripper 2200 of FIG. 13, according to an exemplary embodiment.

The gripper 2200 illustrated in FIGS. 13 and 14 according to another embodiment may include configurations modified from the configurations of the gripper 1200 illustrated in FIGS. 5 and 6. A gripper shaft 2300 and the gripper 2200 are partially illustrated in FIGS. 13 and 14 for convenience in description.

The gripper shaft 2300 may include a rotary disk 2301 protruding from the gripper shaft 2300 to an outside of the gripper shaft 2300 to be rotated together with the gripper shaft 2300 and a cam protrusion 2302 protruding from the rotary disk 2301 to the gripper 2200.

The gripper 2200 may include a large hole 2200a through which the gripper shaft 2300 extends and a cam 2200d which protrudes from one surface of the gripper 2200 to the rotary disk 2301 outside of the large hole 2200a and a protruding height of which is changed in a circumference direction.

Referring to FIG. 14, as the gripper shaft 2300 is rotated, the rotary disk 2301 and the cam protrusion 2302, which are integrally formed outside of the gripper shaft 2300, may be rotated together with the gripper shaft 2300. While the gripper shaft 2300 is rotated in a state that the cam protrusion 2302 comes into contact with the cam 2200d of the gripper 2200, when the cam 2200d reaches the highest portion of the protruding height of the cam 2200d, the cam 2200d of the gripper 2200 may be pressurized by the cam protrusion 2302 to change a location of the gripper 2200.

As illustrated in FIG. 14, the rotary motion of the gripper shaft 2300 may be converted into a rotary motion for an opening/closing operation of the gripper 2200, and may be converted into a linear motion for the opening/closing operation of the gripper 2200, by using an interaction between the cam protrusion 2302 and the cam 2200d.

According to the above exemplary embodiments, the charge may be transferred to a firing location without a residual quantity.

According to the above exemplary embodiments, the charge may be automatically taken out and may be rapidly transferred to the firing location.

In addition, according to the above exemplary embodiments, a desired number of charges may be taken out from the charge loading unit.

It should be understood that the above exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. A charge feeding system comprising:
   a frame extending in a direction parallel to a direction of gravity;
   a plurality of grippers which are attached to the frame, spaced apart from one another in the extension direction of the frame, and independently open and close to grip charges loaded in a charge loading unit comprising a plurality of charge columns in which the charges are vertically stacked;
   a tray configured to pass through locations where the grippers are disposed along the extension direction of the frame, and transfer the charges between the grippers;
   a controller configured to control opening and closing of the grippers and movement of the tray; and
   a sensor configured to sense a number of the charges loaded on the charge loading unit,
   wherein the controller is configured to control the grippers based on a sensing signal received from the sensor to take the charges out from the charge loading unit.

2. The charge feeding system of claim 1, further comprising:
   a driving motor configured to generate power for driving the grippers; and
   a power transmitter configured to transmit the power, wherein each of the grippers comprises:
first and second fingers which are adjustable in location to move away from or closer to each other in a direction crossing the extension direction of the frame;
a gripper shaft rotated by the power transmitted from the power transmitter to move at least one of the first and second fingers; and
a power switch configured to transmit or block the power to the gripper shaft in response to a signal applied from the controller.

3. The charge feeding system of claim 2, wherein the at least one of the first and second fingers is disposed to linearly move, and
wherein the gripper shaft is disposed to penetrate the first and second fingers and has a screw surface screwed to the at least one of the first and second fingers.

4. The charge feeding system of claim 3, wherein the screw surface of the gripper shaft has a first screw surface screwed to the first finger in a first rotation direction and a second screw surface screwed to the second finger in a second rotation direction which is opposite to the first rotation direction.

5. The charge feeding system of claim 2, wherein each of the grippers further comprises:
a hinge shaft configured to support the first and second fingers; and
a slider screwed to the gripper shaft and configured to linearly move along the gripper shaft and apply pressure to the at least one of the first and second fingers as the gripper shaft is rotated, wherein the slider is coupled to an outer surface of the gripper shaft.

6. The charge feeding system of claim 5, wherein each of the first and second fingers comprises a large hole through which the gripper shaft extends.

7. The charge feeding system of claim 5, wherein each of the grippers further comprises an elastic unit configured to elastically support the at least one of the first and second fingers.

8. The charge feeding system of claim 2, wherein the power transmitter comprises:
a plurality of first gears respectively coupled to the grippers; and
a plurality of second gears coupled between adjacent first gears, and
wherein the driving motor is configured to rotate at least one of the first gears.

9. The charge feeding system of claim 1, wherein the tray is configured to move from a location of a loaded gripper gripping a charge among the grippers to a location of a non-loaded gripper among the grippers, and transfer the charge from the loaded gripper to the non-loaded gripper.

10. The charge feeding system of claim 1, further comprising:
a transfer shaft comprising a transfer screw surface on an outer surface thereof, and configured to extend in the extension direction of the frame in a rotatable manner; and
a transfer motor configured to generate power for rotating the transfer shaft,
wherein the tray is screwed to the transfer shaft and configured to move along the transfer shaft as the transfer shaft is rotated.

11. A charge gripping device comprising:
a frame extending in a direction parallel to a direction of gravity;
a plurality of grippers disposed spaced apart from one another in the extension direction of the frame and configured to independently open and close to grip charges loaded in a charge loading unit;
a driving motor configured to generate power for driving the grippers; and
a power transmitter configured to transmit the power,
wherein each of the grippers comprises:
first and second fingers which are adjustable in location to move away from or closer to each other in a direction crossing the extension direction of the frame;
a gripper shaft rotated by the power transmitted from the power transmitter to move at least one of the first and second fingers; and
a power switch configured to transmit or block the power to the power to the gripper shaft, and
wherein each of the grippers further comprises:
a hingeshaft configured to support the first and second fingers; and
a slider screwed to the gripper shaft and configured to lineary move along the gripper shaft and apply pressure to the at least one of the first and second fingers as the gripper shaft is rotated, wherein the slider is coupled to an outer surface of the gripper shaft.

12. The charge gripping device of claim 11, wherein the at least one of the first and second fingers is disposed to linearly move, and
wherein the gripper shaft is disposed to penetrate the first and second fingers and has a screw surface screwed to the at least one of the first and second fingers.

13. The charge gripping device of claim 12, wherein the screw surface of the gripper shaft has a first screw surface screwed to the first finger in a first rotation direction and a second screw surface screwed to the second finger in a second rotation direction which is opposite to the first rotation direction.

14. The charge gripping device of claim 11, wherein each of the first and second fingers comprises a large hole through which the gripper shaft extends.

15. The charge gripping device of claim 11, wherein each of the grippers further comprises an elastic unit configured to elastically support the at least one of the first and second fingers.

16. The charge gripping device of claim 11, wherein the power transmitter comprises:
a plurality of first gears respectively coupled to the grippers; and
a plurality of second gears coupled between the adjacent first gears, and
wherein the driving motor is configured to rotate at least one of the first gears.

17. The charge gripping device of claim 11, further comprising a tray configured to pass through locations where the grippers are disposed along the extension direction of the frame, and transfer the charges between the grippers.

* * * * *